(No Model.)
F. X. BYERLEY.
PROCESS OF AND APPARATUS FOR EXTRACTING OIL AND OTHER SUBSTANCES FROM SEED AND OTHER MATERIALS.
No. 275,989. Patented Apr. 17, 1883.
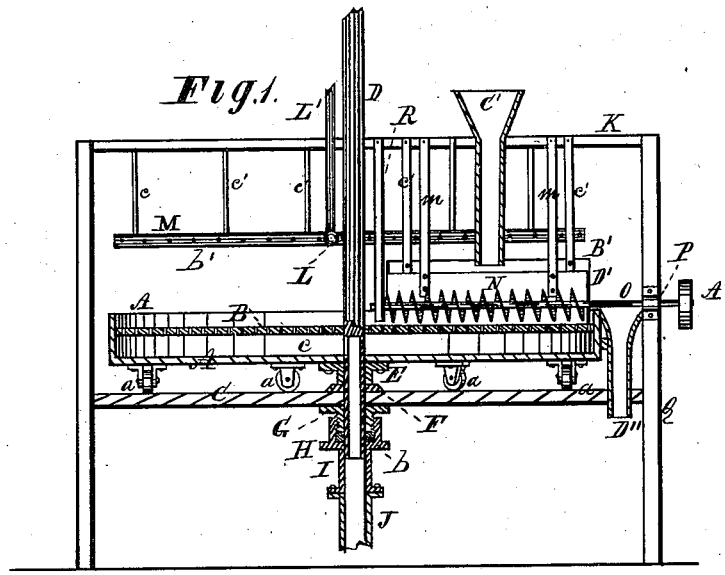
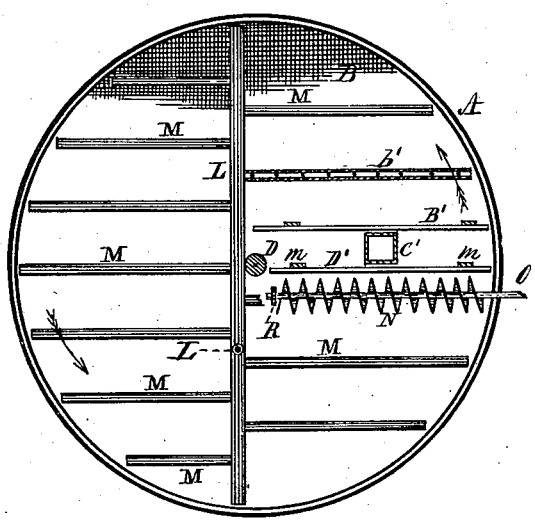
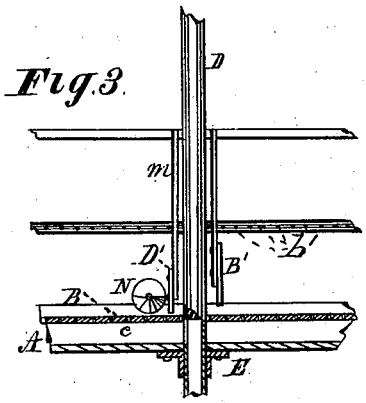
Witnesses.
J. H. Burridge
J. P. Abbott
Inventor
F. X. Byerley
W. H. Burridge atty.

UNITED STATES PATENT OFFICE.

FRANCIS X. BYERLEY, OF CLEVELAND, OHIO.

PROCESS OF AND APPARATUS FOR EXTRACTING OIL AND OTHER SUBSTANCES FROM SEEDS AND OTHER MATERIALS.

SPECIFICATION forming part of Letters Patent No. 275,989, dated April 17, 1883.

Application filed March 7, 1883. (No model.)

*To all whom it may concern:*

Be it known that I, FRANCIS X. BYERLEY, of Cleveland, in the county of Cuyahoga and State of Ohio, have invented a certain new and Improved Process of and Apparatus for Extracting Oils and other Substances from Seeds and other Materials by Means of Solvents; and I do hereby declare that the following is a full, clear, and complete description thereof.

This invention relates to an apparatus and process for extracting soluble substances from the material containing them by the use of a solvent; and it consists in applying the solvent to such material while it is at rest on a revolving perforated diaphragm or moving strainer. The construction of said apparatus and the mode of operation are substantially as hereinafter described. Said apparatus is susceptible of several modifications without changing the nature of the invention. The one, however, shown in the drawings and herein set forth is preferred, and in which Figure 1 represents a vertical transverse section thereof; Fig. 2, a plan view of the inside, and Fig. 3 a detached section.

Like letters of reference refer to like parts in the several views.

In the drawings, A represents a transverse section of a circular pan or shallow tank of any desirable holding capacity. Above the floor of the pan is a foraminous diaphragm or supplementary bottom, B, forming a strainer above the entire surface of the bottom of the pan, a portion of which is shown in Fig. 2 at B. To the under side of the pan are secured rollers, more or less in number, as the size of the pan may require, and upon which it stands, and revolves upon a platform or table, C. Some of said rollers are shown at *a* in Fig. 1. The pan is made to revolve by the shaft D, to which it is secured by a collar, E, made fast to the under side thereof, and through which the shaft passes, as seen in Fig. 1. In said figure it will be seen that the collar rests upon a plate, F, on the platform C, which, together with the rollers, supports the pan in a horizontal position, as shown in the drawings. The lower end of the shaft descends through the platform C, and is secured in a stuffing-box, G, of which H is the gland, and *b* the packing. The gland is provided with a tubular neck, I, to which is connected a pipe, J, by which it may be attached to an exhaust-pump or its equivalent. (Not shown in the drawings.)

It will be observed that the lower end of the shaft, or so much thereof as extends up into the space *c* between the diaphragm and bottom of the pan, is hollow and in open relation with said space, and also in open relation to the pipe J, and that the tubular end of the shaft is made externally air-tight by means of the stuffing-box, and at the same time is free to revolve in the box when operated for rotating the pan independently of the pipe J.

From a beam or beams, K, is suspended by the hangers *c'* a system of pipes, consisting of the main pipe L, Fig. 2, and feed-pipe L', and the tubular arms M, which may be more or less in number. The said arms are perforated with small holes, as seen at *b'* in Figs. 1 and 2, for a purpose presently shown.

N is an endless screw or worm, of which O is the shaft, one end of which is journaled in the box P, secured to the post Q. The opposite end of the shaft is held in a hanger, R, depending from a beam above alluded to. It will be observed that the endless screw is arranged near to the surface of the diaphragm B, and that the shaft is above the rim of the pan and is driven by a pulley, A'.

On one side of the endless screw is a scraper, consisting of a board, D', suspended by hangers *m* from the beam K, or otherwise held in position. On the other side of said scraper is a hopper, C', through which the material to be treated is fed to the apparatus. Beyond the hopper C' is arranged a spreader consisting of a board, B', suspended by hangers from a beam, or otherwise secured in position. Said spreader extends from near the center of the pan to its circumference, and at a greater or less height above the strainer, as the quantity of material to be spread thereon to be treated may require, which may be more or less in depth.

Practically the operation of the above-described apparatus is as follows: Power is applied to the shaft D for revolving the pan in the direction of the arrows shown in Fig. 2. If linseed-meal is to be treated, it is fed to the pan by passing it down through the conductor C', which, as it falls upon the perforated diaphragm or strainer, is distributed evenly over it by the spreader B', above alluded to, against which it is carried by the motion of the pan. While the meal is thus being spread over the slowly-revolving strainer it is saturated with a solvent sprinkled over it from the system of perforated pipes above described, admitted to said pipes through the feed-pipe L'. The solvent, together with the oil extracted thereby from the meal while the strainer and pan revolve, percolates through the strainer into the pan below, from which it flows through the tubular end of the shaft to the eduction-pipe J, from which it is taken for being further treated for separating the oil and solvent, which may be done in the ordinary way.

To facilitate the escape of the solvent and oil from the meal is the purpose of an exhaust-pump or other equivalent means above alluded to, which, by exhausting the air from below the perforated diaphragm, forms a partial vacuum, which, in consequence of the pressure of air above, induces a more free and immediate flow of oil and solvent, hastening by this means the process of extracting the oil from the meal during the revolving movement of the strainer and pan. The pan, by its revolution, brings the exhausted meal in contact with the endless screw N, which, being set in motion by the pulley A', carries the exhausted meal or other treated material from the center to the circumference of the fan, and discharges it therefrom into the hopper D'', whence it passes to a receptacle adapted to receive it.

It will be noticed that the above-described process is continuous and automatic, and consequently more economical, expeditious, and requiring less labor and manipulation than in the usual way. The said apparatus and process may be employed for the extraction of solvents from material or substances other than oleaginous seeds.

What I claim as my invention, and desire to secure by Letters Patent, is—

1. In an apparatus for extracting soluble matter from the material containing it, by the employment of a solvent for said purpose, a revolving pan or receptacle provided with a foraminous diaphragm, shaft D, having a tubular end in open communication with the interior of said pan, between the bottom thereof and the foraminous diaphragm, said shaft being the axis of the pan's rotation, and by which it is revolved, substantially as herein described, and for the purpose set forth.

2. In combination with the revolving pan B, an arrangement of perforated pipes consisting of the main pipe L and arms or branches M thereof, and supply-pipe L', adapted to and arranged in relation to the said pan, substantially as described, and for the purpose specified.

3. In an apparatus for extracting oil from oleaginous substances, the endless screw N, scraper and hopper D'', hopper C', and spreader, constructed and arranged to operate and co-operate in combination with the revolving pan B, substantially as described, and for the purpose specified.

4. The herein-described process of extracting oil from oleaginous substances or soluble matter from the material containing it by the employment of a solvent, which consists in applying said solvent to such material while it is at rest on a moving foraminous diaphragm or strainer, through which the solution passes from the material on the moving strainer to a receptacle for containing it, substantially as described.

5. The herein-described process of extracting oil from oleaginous substances, which consists in applying a solvent to the said substance while it is at rest upon a revolving or moving perforated diaphragm or strainer through which the solution passes, and using as an auxiliary agent, in connection therewith, an exhaust-pump for producing a vacuum below the material being treated to facilitate the escape of oil and solvent therefrom, substantially as set forth.

In testimony whereof I affix my signature in presence of two witnesses.

FRANCIS X. BYERLEY.

Witnesses:
W. H. BURRIDGE,
J. H. BURRIDGE.